US012766452B2

(12) United States Patent
Masuda

(10) Patent No.: US 12,766,452 B2
(45) Date of Patent: Oct. 20, 2026

(54) HONEYCOMB FILTER

(71) Applicant: NGK INSULATORS, LTD., Nagoya (JP)

(72) Inventor: Sachiko Masuda, Nagoya (JP)

(73) Assignee: NGK INSULATORS, LTD., Nagoya-City (JP)

( * ) Notice: Subject to any disclaimer, the term of this patent is extended or adjusted under 35 U.S.C. 154(b) by 324 days.

(21) Appl. No.: 18/433,516

(22) Filed: Feb. 6, 2024

(65) Prior Publication Data

US 2024/0350958 A1 Oct. 24, 2024

(30) Foreign Application Priority Data

Apr. 21, 2023 (CN) ......................... 202310433188.8

(51) Int. Cl.
*B01D 46/24* (2006.01)

(52) U.S. Cl.
CPC ..... *B01D 46/2484* (2021.08); *B01D 46/2482* (2021.08); *B01D 46/249* (2021.08); *B01D 2275/30* (2013.01)

(58) Field of Classification Search
CPC ............ B01D 46/0001; B01D 46/2429; B01D 46/24491; B01D 46/24492; B01D 46/2451; B01D 46/2482; B01D 46/2484; B01D 46/249; B01D 46/2498; B01D 53/1925; B01D 53/94; B01D 2257/402; B01D 2257/404; B01D 2257/502; B01D 2257/702; B01D 2258/01; B01D 2275/30; B01D 2279/30; F01N 3/0222; F01N 2330/30
See application file for complete search history.

(56) References Cited

U.S. PATENT DOCUMENTS

2003/0041574 A1* 3/2003 Noguchi ............... F01N 3/0222 55/523
2015/0260067 A1* 9/2015 Kikuchi ............. B01D 46/2474 427/244
2019/0178126 A1* 6/2019 Nagai ................ B01D 46/2482
2021/0270162 A1* 9/2021 Sendo ..................... C04B 35/64

FOREIGN PATENT DOCUMENTS

JP 2002-219319 A 8/2002

* cited by examiner

*Primary Examiner* — Jennifer Dieterle
*Assistant Examiner* — Phillip Y Shao
(74) *Attorney, Agent, or Firm* — Muncy, Geissler, Olds & Lowe, P.C.

(57) ABSTRACT

A honeycomb filter includes a pillar-shaped honeycomb structure having a porous partition wall and a porous plugging portion, wherein the partition wall is composed of a material containing cordierite as a main component, a porosity of the partition wall is 60 to 70%, a ratio (S2/S1×100%) of the total S2 of an opening area of pores which exist within a unit surface area S1 and which have an equivalent circle diameter exceeding 3 μm with respect to the unit surface area S1 of the partition wall is 58 to 70%, and a ratio (R/D) of an average equivalent circle opening diameter R (μm) of pores which exist at a surface of the partition wall and which have an equivalent circle diameter exceeding 3 μm with respect to an average pore diameter D (μm) of the partition wall measured by a mercury press-in method is 0.3 to 0.8.

4 Claims, 3 Drawing Sheets

HONEYCOMB FILTER

The present application is an application based on Chinese Patent Application No. 202310433188.8 filed on Apr. 21, 2023 with State Intellectual Property Office of the people's Republic of China, the entire contents of which are incorporated herein by reference.

BACKGROUND OF THE INVENTION

Field of the Invention

The present invention relates to a honeycomb filter. More specifically, the present invention relates to a honeycomb filter capable of improving filtration efficiency and suppressing an increase in pressure loss when a catalyst for purifying exhaust gas is loaded.

Description of the Related Art

Conventionally, a honeycomb filter using a honeycomb structure has been known as a filter for trapping particulate matter in exhaust gas emitted from an internal combustion engine such as an automobile engine or a device for purifying toxic gas components such as CO, HC, NOx (see Patent Document 1). The honeycomb structure includes a partition wall made of porous ceramics such as cordierite and a plurality of cells defined by the partition wall. A honeycomb filter includes such a honeycomb structure provided with plugging portions so as to plug the open ends at the inflow end face side and the outflow end face side of the plurality of cells alternately. In other words, the honeycomb filter has a structure in which inflow cells having the inflow end face side open and the outflow end face side plugged and outflow cells having the inflow end face side plugged and the outflow end face side open are arranged alternately with the partition wall therebetween. In the honeycomb filter, the porous partition wall serves as a filter for trapping the particulate matter in exhaust gas. Hereinafter, the particulate matter contained in exhaust gas may be referred to as "PM". The "PM" is an abbreviation for "Particulate Matter."

The purification of exhaust gas by the honeycomb filter is performed as follows. First, the honeycomb filter is arranged such that its inflow end face side is located upstream in the exhaust system from which exhaust gas is emitted. Exhaust gas flows into the inflow cell from the inflow end face side of the honeycomb filter. Exhaust gas flowing into the inflow cell passes through the porous partition wall, flows into the outflow cell, and is emitted from the outflow end face of the honeycomb filter. When passing through the porous partition wall, PM or the like in exhaust gas is trapped and removed. In addition, such honeycomb filters may load an oxidation catalyst for promoting oxidation (burning) of PM, a catalyst for purifying exhaust gas that purifies harmful components such as NOx, and the like.

[Patent Document 1] JP-A-2002-219319

In recent years, exhaust gas regulations for automobiles have become stricter year by year, and enhanced performance of the honeycomb filter used for purifying exhaust gas is required. For example, in order to improve trapping performance of PM, it has been studied to reduce an average pore diameter of the porous partition wall. On the other hand, as described above, the honeycomb filter may be used with a catalyst for purifying exhaust gas (hereinafter, also simply referred to as "catalyst") or the like loaded thereon. When the honeycomb filter is used with a catalyst loaded thereon, the opening diameter of the pores on the surface of the partition wall should be as large as possible in order to reduce the pressure loss after loading the catalyst and to make it easier to load the catalyst in the pores of the partition wall.

However, when the opening diameter of the pores on the surface of the partition wall is increased, a large hole remains on the surface of the partition wall after loading the catalyst, and the trapping performance of the honeycomb filter may be deteriorated. In addition, as a measure for improving trapping performance of the honeycomb filter, a method of loading a catalyst in a layered manner on the surface of the partition wall has been studied, but as described above, when the opening diameter of the pores on the surface of the partition wall is increased, the surface of the partition wall cannot be completely covered with the catalyst, and the effect of improving trapping performance by loading of the catalyst is reduced. On the other hand, in view of improving trapping performance, when the pore diameter of the entire partition wall is reduced, flow path blockage of the exhaust gas flow path in the partition wall is likely to occur, and the increase in pressure loss becomes large after loading the catalyst.

The present invention has been made in view of the problems of the prior arts described above. According to the present invention, there is provided a honeycomb filter capable of improving filtration efficiency and suppressing an increase in pressure loss when a catalyst for purifying exhaust gas is loaded.

SUMMARY OF THE INVENTION

According to the present invention, a honeycomb filter described below is provided.

[1] A honeycomb filter including: a pillar-shaped honeycomb structure having a porous partition wall disposed so as to surround a plurality of cells which serve as a fluid through channel extending from an inflow end face to an outflow end face; and

- a porous plugging portion provided at either an end on the inflow end face side or an end on the outflow end face side of the cell; wherein
- the partition wall is composed of a material containing cordierite as a main component,
- a porosity of the partition wall is 60 to 70%,
- a ratio ($S2/S1\times100\%$) of the total S2 of an opening area of pores which exist within a unit surface area S1 and which have an equivalent circle diameter exceeding 3 μm with respect to the unit surface area S1 of the partition wall is 58 to 70%, and
- a ratio (R/D) of an average equivalent circle opening diameter R (μm) of pores which exist at a surface of the partition wall and which have an equivalent circle diameter exceeding 3 μm with respect to an average pore diameter D (μm) of the partition wall measured by a mercury press-in method is 0.3 to 0.8.

[2] The honeycomb filter according to [1], wherein a ratio ($S3/S2\times100\%$) of the total S3 of an opening area of pores which exist within the unit surface area S1 and which have an equivalent circle diameter of 40 μm or more with respect to the total S2 of an opening area of pores which exist within a unit surface area S1 and which have an equivalent circle diameter exceeding 3 μm is 3 to 5%.

[3] The honeycomb filter according to [1] or [2], wherein a pore depth of pores on the surface of the partition wall is 1.0 to 3.0 μm as determined by a laser microscope.

[4] The honeycomb filter according to any one of [1] to [3], wherein a thickness of the partition wall is 190.5 to 254 μm.

The honeycomb filter of the present invention is capable of improving filtration efficiency and suppressing an increase in pressure loss when a catalyst for purifying exhaust gas is loaded.

DESCRIPTION OF THE PREFERRED EMBODIMENTS

The following will describe embodiments of the present invention; however, the present invention is not limited to the following embodiments. Therefore, it should be understood that those created by adding changes, improvements or the like to the following embodiments, as appropriate, on the basis of the common knowledge of a person skilled in the art without departing from the spirit of the present invention are also covered by the scope of the present invention.

Figure 1:
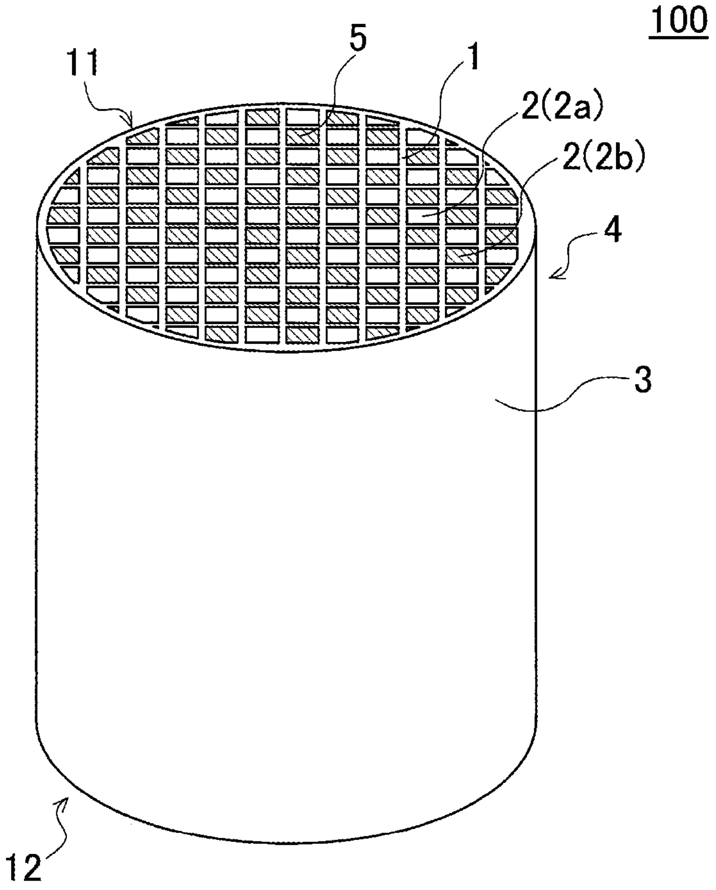
FIG. 1 is a perspective view schematically showing an embodiment of a honeycomb filter according to the present invention.
Figure 2:
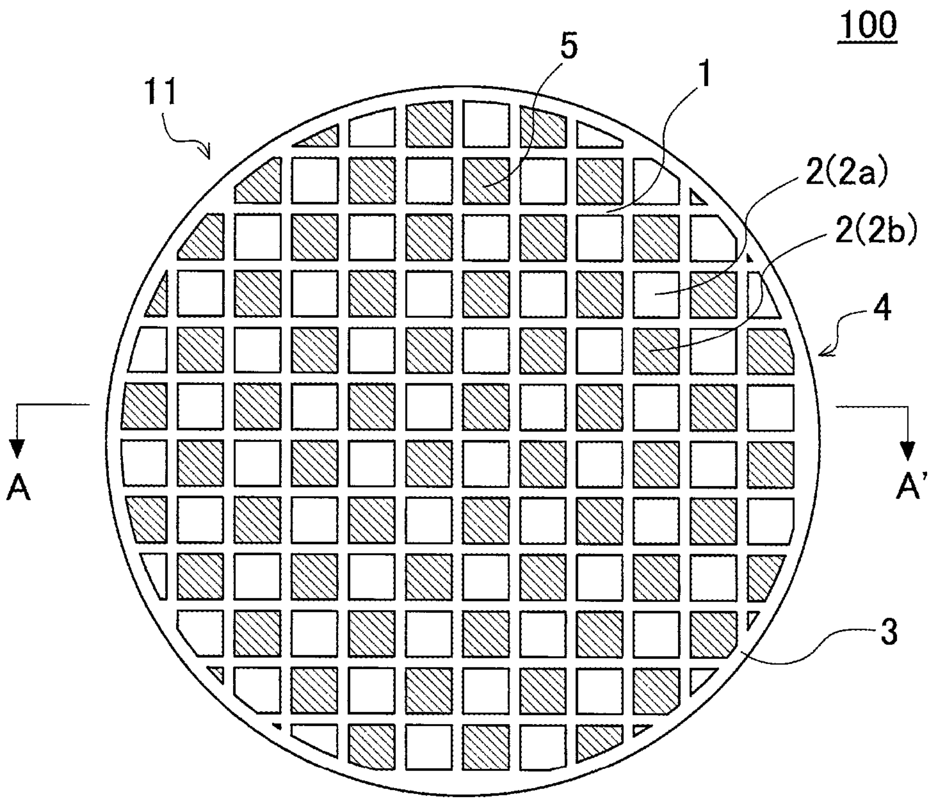
FIG. 2 is a plan view showing an inflow end face side of the honeycomb filter shown in FIG. 1.
Figure 3:
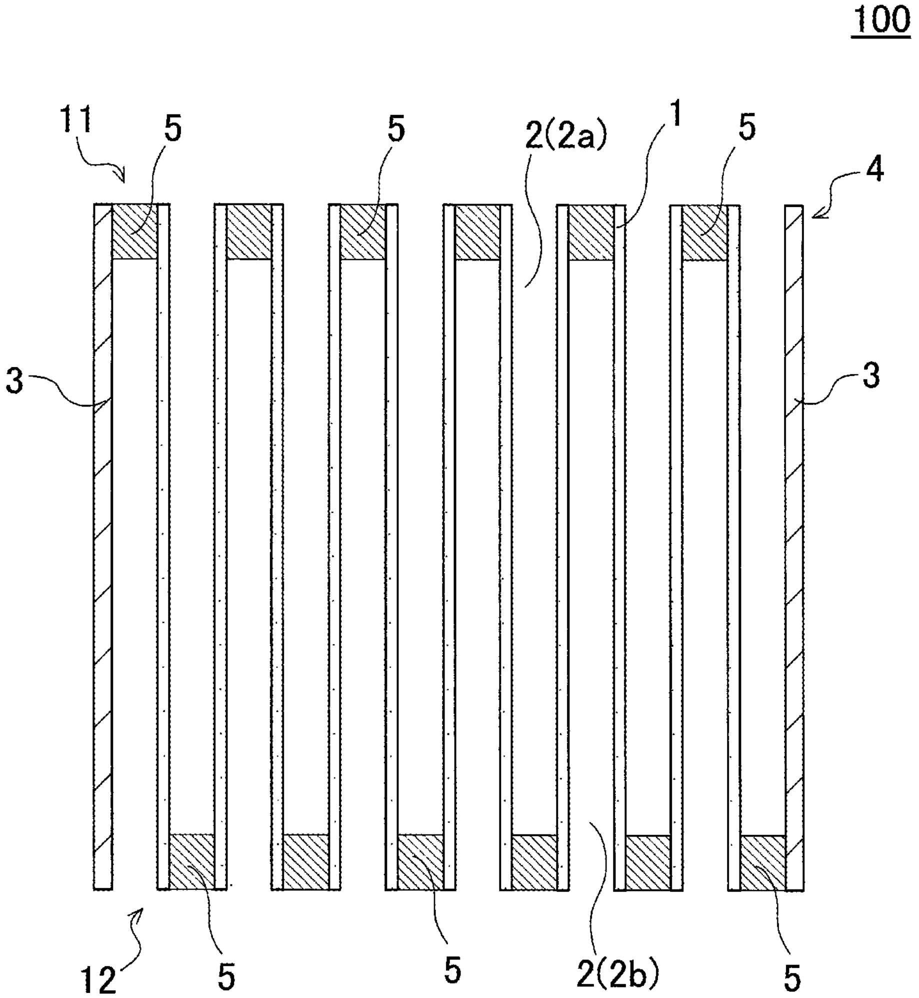
FIG. 3 is a sectional view schematically showing a section taken along the line A-A' of FIG. 2.

(1) Honeycomb Filter:

An embodiment of the honeycomb filter of the present invention is a honeycomb filter 100 as shown in FIGS. 1 to 3. Here, FIG. 1 is a perspective view schematically showing an embodiment of the honeycomb filter of the present invention. FIG. 2 is a plan view showing an inflow end face side of the honeycomb filter shown in FIG. 1. FIG. 3 is a sectional view schematically showing a section taken along the line A-A' of FIG. 2.

As shown in FIGS. 1 to 3, the honeycomb filter 100 includes a honeycomb structure 4 and a plugging portion 5. The honeycomb structure 4 is of pillar-shaped having a porous partition wall 1 disposed to surround a plurality of cells 2 which serve as a fluid through channel extending from an inflow end face 11 to an outflow end face 12. In the honeycomb filter 100, the honeycomb structure 4 has a pillar shape, and further has a circumferential wall 3 at the outer peripheral side face thereof. That is, the circumferential wall 3 is disposed to encompass the partition wall 1 arranged in a grid pattern.

The plugging portions 5 are arranged at open ends of the inflow end face 11 side or the outflow end face 12 side of each of the cells 2. In the honeycomb filter 100 shown in FIGS. 1 to 3, the plugging portion 5 are disposed at open ends at the ends on the inflow end face 11 side of predetermined cells 2 and at open ends at the ends on the outflow end face 12 side of the remaining cell 2, respectively. The cell 2 in which the plugging portion 5 is disposed at open end on the outflow end face 12 side and the inflow end face 11 side is opened is defined as an inflow cell 2*a*. Further, the cell 2 in which the plugging portion 5 is disposed at the open end on the inflow end face 11 side and the outflow end face 12 side is opened is defined as an outflow cell 2*b*. The inflow cell 2*a* and the outflow cell 2*b* are preferably disposed alternately with the partition wall 1 therebetween. In addition, it is preferable that a checkerboard pattern is thereby formed by the plugging portion 5 and the "open ends of the cells 2" on both end faces of the honeycomb filter 100.

The honeycomb filter 100 of the present embodiment has particularly major properties in the configuration of the porous partition wall 1 constituting the honeycomb structure 4. Hereinafter, a configuration of the porous partition wall 1 constituting the honeycomb structure 4 will be described.

First, the partition wall 1 is made of a material containing cordierite as a main component. That is, the partition wall 1 is a porous material made of a material containing cordierite as a main component. Here, the "main component" means a component present in the component in an amount of 90% by mass or more. The material constituting the partition wall 1 preferably contains cordierite in an amount of 92% by mass or more, and more preferably 94% by mass or more. It is particularly preferable that the partition wall 1 is made of cordierite except for components inevitably contained therein.

The honeycomb filter 100 has a porosity of the partition wall 1 of 60 to 70%. The porosity of the partition wall 1 is measured by the mercury press-in method. The porosity of the partition wall 1 can be measured using, for example, Autopore 9500 (trade name) manufactured by Micromeritics. To measure the porosity of the partition wall 1, a part of the partition wall 1 is cut out from the honeycomb structure 4 to obtain a sample piece, and the sample piece thus obtained can be used. The porosity of the partition wall 1 is preferably constant over the entire region of the honeycomb structure 4. When the partition wall 1 has a porosity of less than 60% or greater than 70%, pressure loss increases when a catalyst for purifying exhaust gas is loaded to the partition wall 1. The porosity of the partition wall 1 is preferably 65 to 70%, more preferably 67 to 70%.

In the honeycomb filter 100, a ratio (S2/S1×100%) of the total S2 of an opening area of pores which exist within a unit surface area S1 and which have an equivalent circle diameter exceeding 3 μm with respect to the unit surface area S1 of the partition wall 1 is 58 to 70%. With this configuration, it is possible to improve filtration efficiency and suppress an increase in pressure loss when a catalyst for purifying exhaust gas is loaded.

The total S2 of an opening area of pores which exist within a unit surface area S1 of the partition wall 1 and which have an equivalent circle diameter exceeding 3 μm can be measured by the following method. First, a measuring sample is cut out from the honeycomb structure 4 so that the surface of the partition wall 1 of the honeycomb structure 4 can be observed. Then, the surface of the partition wall 1 of the measuring sample is photographed with a laser microscope. As the laser microscope, for example, a shape-analysis laser microscope of "VK X250/260 (trade name)" manufactured by Keyence Corporation can be used. In photographing the surface of the partition wall 1, the magnification is set at 480 times, and arbitrary positions of 10 fields of view are photographed. The captured images are subjected to image processing, and the opening area $S_x$ ($\mu m^2$) and the equivalent circle diameter (μm) of the respective pores on the surface of the partition wall 1 are obtained. In the image processing, an area is selected so as not to include the parts of the partition wall 1 other than the surface of the partition wall 1 in the area where the image processing is performed, and the inclination of the surface of the partition wall 1 is corrected horizontally. Then, the upper limit of the height recognized as a pore is changed to −3.0 μm from the reference plane. Under the condition that pores having an equivalent circle diameter of 3 μm or less are ignored, the opening area $A_x$ ($\mu m^2$) and the equivalent circle diameter $R_x$ (μm) of the respective pores of the captured image are calculated by the image processing software. The equivalent circle diameter $R_x$ (μm) of pores on the surface of the partition wall 1 can be determined by measuring the opening area $A_x$ ($μm^2$) of the respective pores and calculating the equivalent circle diameter $R_x$ (μm)=$\sqrt{}${4×(opening area $A_x$ ($μm^2$))/π} with respect to the measured opening area $A_x$ ($μm^2$). Then, a ratio (S2/S1×100%) of the total S2 of the opening area of pores which exist within a unit surface area S1 and which have an equivalent circle diameter exceeding 3 μm with respect to the unit surface area S1 of the partition wall 1 is calculated. Hereinafter, the above-described ratio may be referred to as a "ratio (%) of the total opening area of pores having an equivalent circle diameter exceeding 3 μm". The "total S2 of an opening area of pores which exist within a unit surface area S1 and which have an equivalent circle diameter exceeding 3 μm" can be calculated as the total per unit surface area S1 of the "opening area $A_x$ ($μm^2$)" measured by the above-described method. In addition, the "unit surface area S1" may have any size, and for example, the "unit surface area S1" may be 1 $mm^2$. The ratio (%) of the total opening area of pores having an equivalent circle diameter exceeding 3 μm shall be an average value of the measured results of 10 fields of view (that is, the ratio (%) of the total opening area of pores having an equivalent circle diameter exceeding 3 μm of respective captured images of 10 fields of view). As the image processing software, for example, "VK-X (trade name)" attached to a shape-analysis laser microscope of "VK X250/260 (trade name)" manufactured by Keyence Corporation can be used. The measurement of an equivalent circle diameter of the respective pores and the image analysis in which the pores having a predetermined equivalent circle diameter are ignored can be performed by the above-described image processing software.

The ratio (%) of the total opening area of pores which exist at a surface of the partition wall 1 and have an equivalent circle diameter exceeding 3 μm may be 58 to 70%, and for example, preferably 60 to 70%, and more preferably 65 to 70%.

Further, the honeycomb filter 100 has a ratio (R/D) of an average equivalent circle opening diameter R (μm) of pores which exist at a surface of the partition wall 1 and which have an equivalent circle diameter exceeding 3 μm with respect to an average pore diameter D (μm) of the partition wall 1 measured by a mercury press-in method is 0.3 to 0.8. With this configuration, it is possible to improve filtration efficiency and suppress an increase in pressure loss when a catalyst for purifying exhaust gas is loaded. Hereinafter, the average equivalent circle opening diameter R (μm) of the pores which exist at a surface of the partition wall 1 may be simply referred to as an "average equivalent circle opening diameter R (μm) of pores on the surface of the partition wall 1" or an "average opening diameter R (μm) of pores on the surface of the partition wall 1".

The average equivalent circle opening diameter R (μm) of pores on the surface of the partition wall 1 can be obtained from the results of the image analysis when calculating the ratio (%) of the total opening area of the pores having an equivalent circle diameter exceeding 3 μm. That is, from the opening area $A_x$ ($μm^2$) of each pore measured by the image analysis, the equivalent circle diameter $R_x$ (μm) of each pore can be calculated by the above-described calculation formula. The value of the average equivalent circle opening diameter R (μm) of pores on the surface of the partition wall 1 is an average value of the measured results of 10 fields of view (that is, the equivalent circle diameter $R_x$ (μm) of the respective captured images of 10 fields of view). Although not particularly limited, the average equivalent circle opening diameter R (μm) of pores on the surface of the partition wall 1 is preferably 5 to 12 μm.

On the other hand, an average pore diameter D (μm) of the partition wall 1 is measured by mercury press-in method. The average pore diameter D (μm) of the partition wall 1 can be measured, for example, using Autopore 9500 (trade name) manufactured by Micromeritics. The average pore diameter D (μm) can be measured using the above-described test piece for measuring porosity. Although not particularly limited, the average pore diameter D (μm) of the partition wall 1 is preferably 9 to 15 μm. The average pore diameter D (μm) of the partition wall 1 is a value calculated by defining it as a pore diameter that gives half the volume of the total pore volume by the mercury press-in method.

The ratio (R/D) of the average equivalent circle opening diameter R (μm) of pores on the surface of the partition wall 1 with respect to the average pore diameter D (μm) of partition wall 1 may be 0.3 to 0.8, and for example, preferably 0.3 to 0.7, and more preferably 0.3 to 0.5.

In the honeycomb filter 100, a ratio (S3/S2×100%) of the total S3 of an opening area of pores which exist within a unit surface area S1 of the partition wall 1 and which have an equivalent circle diameter of 40 μm or more with respect to the total S2 of an opening area of pores which exist within the unit surface area S1 and which have an equivalent circle diameter exceeding 3 μm is preferably 3 to 5%. With this configuration, filtration efficiency of the honeycomb filter 100 can be further improved. The total S3 of an opening area of pores having an equivalent circle diameter of 40 μm or more can be obtained from the results of the image analysis when calculating the ratio (%) of the total opening area of pores having the equivalent circle diameter exceeding 3 μm. That is, after determining the equivalent circle diameter $R_x$ (μm) of the respective pores on the surface of the partition wall 1, a total of the opening area $A_x$ ($μm^2$) of only pores having an equivalent circle diameter $R_x$ (μm) of 40 μm or more is the total S3 of an opening area of pores having the equivalent circle diameter of 40 μm or more. Hereinafter, the ratio (%) of the total S3 of an opening area of pores having an equivalent circle diameter of 40 μm or more may be referred to as "a ratio (%) of the total opening area of pores having an equivalent circle diameter of 40 μm or more".

The honeycomb filter 100 preferably has a pore depth of pores on the surface of the partition wall 1 is 1.0 to 3.0 μm as determined by a laser microscope. With this configuration, the catalyst is easily applied onto the partition wall 1, and filtration efficiency after the catalyst coating of the honeycomb filter 100 can be further improved. The pore depth of pores on the surface of the partition wall 1 represents the depth of pores open to the surface of the porous partition wall 1. Hereinafter, the "pore depth of pores on the surface of the partition wall 1" may be referred to as the "pore depth on the surface of the partition wall 1".

The pore depth of pores on the surface of the partition wall 1 can be measured by the following method. First, a part of the partition wall 1 is cut out from the honeycomb filter 100 to obtain a measurement sample, and the unevenness of the surface of the partition wall 1 of the measurement sample is photographed by a laser microscope. As the laser microscope, a shape-analysis laser microscope "VK-X250/260 (trade name)" manufactured by Keyence Corporation can be used. The magnification at the time of measurement is 240 times. The captured images are subjected to image processing using a multi-file analysis application VK-H1XM, and regions having a specific light amount are eliminated. Further, surface shape correction is performed on the image. The reference plane is set to −3 μm from the surface of the partition wall and the pore depth of pores having a pore diameter from the reference plane of 3.8 μm or more is measured. The number-average value of the measured values is pore depth (μm) of the partition wall 1.

The thickness of the partition wall 1 is not particularly limited, but for example, the thickness of the partition wall 1 is preferably 190.5 to 254 μm, and more preferably 215.9 to 241.3 μm. The thickness of the partition wall 1 can be measured, for example, using a scanning electron-microscope or a microscope. When the thickness of the partition wall 1 is less than 190.5 μm, satisfactory strength may not be obtained. On the other hand, when the thickness of the partition wall 1 exceeds 254 μm, pressure loss of the honeycomb filter 100 may increase.

The shape of the cells 2 defined by the partition wall 1 is not particularly limited. For example, the shape of the cell 2 in a section orthogonal to the extending direction of the cells 2 may be polygonal, circular, elliptical, or the like. A polygonal shape may be triangular, quadrangular, pentagonal, hexagonal, octagonal, or the like. The shape of the cells 2 is preferably triangular, quadrangular, pentagonal, hexagonal, or octagonal. Further, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be larger and other cells may be relatively smaller. In the present invention, a cell means a space surrounded by the partition wall.

The cell density of the honeycomb structure 4 is not particularly limited, but for example, the cell density of the honeycomb structure 4 is preferably 43.4 to 49.6 cells/$cm^2$, and more preferably 45.0 to 48.1 cells/$cm^2$. With this configuration, it is possible to suppress an increase in pressure loss while maintaining trapping property of the honeycomb filter 100.

The shape of the honeycomb structure 4 is not particularly limited. The shape of the honeycomb structure 4 may include a pillar-shaped in which the shape of the inflow end face 11 and the outflow end face 12 is circular, elliptical, polygonal, or the like.

The size of the honeycomb structure 4, for example, the length from the inflow end face 11 to the outflow end face 12, and the size of the section orthogonal to the extending direction of the cells 2 of the honeycomb structure 4 are not particularly limited. Each size may be selected as appropriate such that optimum purification performance is obtained when the honeycomb filter 100 is used as a filter for purifying exhaust gas.

The material of the plugging portion 5 is not particularly limited. For example, the material may be the same as the material of the partition wall 1 described above, or may be a material different from the material of the partition wall 1.

In the honeycomb filter 100, it is preferable that the partition wall 1 defining a plurality of cells 2 is loaded with a catalyst for purifying exhaust gas. The partition wall 1 is loaded with a catalyst means that the catalyst is coated on the surface of the partition wall 1 and the inner wall of pores formed on the partition wall 1. With this configuration, CO, NOx and HC in exhaust gas can be made harmless by a catalytic reaction. In addition, oxidization of PM such as trapped soot can be promoted.

The catalyst loaded on the partition wall 1 is not particularly limited. For example, such catalysts may include a catalyst containing a platinum group element and containing an oxide of at least one element among aluminum, zirconium, and cerium. The loaded amount of the catalyst is preferably 50 to 100 g/L. In this specification, the loaded amount (g/L) of the catalyst indicates the amount (g) of the catalyst loaded per unit volume (L) of the honeycomb filter 100.

(2) Manufacturing Method of Honeycomb Filter:

The manufacturing method of the honeycomb filter of the present invention is not particularly limited, and examples thereof include the following method. First, a plastic kneaded material for making a honeycomb structure is prepared. The kneaded material for making a honeycomb structure can be prepared by adding an additive such as a binder, pore former, and water, as appropriate, to a material selected from the above-described suitable materials of the partition wall, as a raw material powder. In manufacturing the honeycomb filter of the present invention, kaolin, talc, alumina, aluminium hydroxide, silica, and the like are used as raw material powders for preparing a kneaded material, and these raw material powders can be prepared so as to have a chemical composition of 42 to 56% by mass of silica, 30 to 45% by mass of alumina, and 12 to 16% by mass of magnesia. The pore former may have a spherical shape with an average particle diameter of 10 to 25 μm, and the kaolin, alumina, and aluminium hydroxide may have an average particle diameter of 7 μm or less.

Next, the kneaded material thus obtained is subjected to extrusion so as to make a pillar-shaped honeycomb formed body having a partition wall defining a plurality of cells and a circumferential wall disposed so as to encompass the partition wall. In the extrusion, a die in which a slit having an inverted shape of the honeycomb formed body to be formed is formed on the extruded surface of the kneaded material can be used as the die for the extrusion.

The obtained honeycomb formed body is dried, for example, by microwave and hot air, and an open end of the cell is plugged with a material similar to the material used for making the honeycomb formed body to provide a plugging portion. After forming the plugging portion, the honeycomb formed body may be further dried.

Next, a honeycomb filter is manufactured by firing the honeycomb formed body in which a plugging portion is formed. The firing temperature and the firing atmosphere differ according to the raw material, and those skilled in the art can select the firing temperature and the firing atmosphere that are the most suitable for the selected material.

EXAMPLES

Hereinafter, the present invention will be described in more detail by examples, but the present invention is not at all limited by these examples.

Example 1

A cordierite forming raw material was prepared using kaolin, talc, alumina, aluminium hydroxide, and silica as cordierite raw material powders and mixing them. Then, pore former, dispersing medium, and a binder were added to the prepared cordierite forming raw material, respectively, and mixed and kneaded to prepare a kneaded material. The pore former used has a spherical shape with an average particle diameter of 20 μm, and talc with an average particle diameter of 7 μm, kaolin with an average particle diameter of 4 μm, alumina with an average particle diameter of 5 μm, and aluminum hydroxide with an average particle diameter of 4 μm were used.

Next, the obtained kneaded material was molded using an extruder to make a honeycomb formed body. Next, the obtained honeycomb formed body was dried by high frequency dielectric heating and then further dried using a hot air dryer. The shape of the cells in the honeycomb formed body was quadrangular.

Next, a plugging portion was formed on the dried honeycomb formed body. First, the inflow end face of the honeycomb formed body was masked. Next, an end portion provided with a mask (the end portion on the inflow end face side) was immersed in a plugging slurry, and the plugging slurry was filled into an open end of the cell without the mask (the outflow cell). In this way, a plugging portion was formed on the inflow end face of the honeycomb formed body. Then, the plugging portion was also formed in the inflow cell in the same manner for the outflow end face of the dried honeycomb formed body.

depth of pore (μm)" on the surface of the partition wall was determined by the above-described method. The results are shown in Table 1.

[Porosity (%) and Average Pore Diameter D (μm)]

The porosity (%) and the average pore diameter D (μm) of the partition wall were measured using Autopore 9500 (trade name) manufactured by Micromeritics. In the measurement of the porosity (%) and the average pore diameter D (am), a part of the partition wall was cut out from the honeycomb filter to obtain a test piece, and the obtained test piece was used for the measurement. The test piece was a rectangular parallelepiped having a length, a width, and a height of approximately 10 mm, approximately 10 mm, and approximately 20 mm, respectively. The sampling location of the test piece was set in the vicinity of the center of the honeycomb structure in the axial direction.

TABLE 1

| | Porosity (%) | Ratio (%) of total opening area of pores with equivalent circle diameter exceeding 3 μm | Average equivalent circle opening diameter R (μm) | Average pore diameter D (μm) | Ratio (R/D) of average equivalent circle opening diameter R with respect to average pore diameter D | Ratio (%) of total opening area of pores with equivalent circle diameter of 40 μm or more | Pore depth of pore (μm) | Thickness of partition wall (μm) |
|---|---|---|---|---|---|---|---|---|
| Comparative Example 1 | 62 | 72 | 15 | 10 | 1.5 | 10 | 8 | 215.9 |
| Comparative Example 2 | 68 | 71 | 10 | 11 | 0.9 | 11 | 8 | 215.9 |
| Comparative Example 3 | 64 | 57 | 6 | 15 | 0.4 | 14 | 8 | 215.9 |
| Comparative Example 4 | 71 | 66 | 12 | 14 | 0.9 | 11 | 6 | 215.9 |
| Comparative Example 5 | 59 | 68 | 6 | 15 | 0.4 | 12 | 7.5 | 215.9 |
| Comparative Example 6 | 65 | 67 | 13 | 7 | 1.9 | 10 | 8 | 215.9 |
| Example 1 | 68 | 67 | 6 | 12 | 0.5 | 10 | 8 | 215.9 |
| Example 2 | 69 | 69 | 5 | 15 | 0.3 | 12 | 3 | 228.6 |
| Example 3 | 70 | 70 | 5 | 15 | 0.3 | 5 | 3 | 203.2 |
| Example 4 | 68 | 66 | 6 | 8 | 0.8 | 11 | 7 | 203.2 |
| Example 5 | 68 | 69 | 11 | 15 | 0.7 | 10 | 6 | 203.2 |
| Example 6 | 68 | 69 | 7 | 15 | 0.5 | 10 | 6 | 215.9 |
| Example 7 | 70 | 69 | 7 | 15 | 0.5 | 3 | 1 | 190.5 |

Next, the honeycomb formed body on which the plugging portions have been formed was dried with a microwave dryer and completely dried with a hot air dryer, and then both end faces of the honeycomb formed body were cut and adjusted to a predetermined size. The dried honeycomb formed body was then degreased and calcined to manufacture a honeycomb filter of Example 1.

The honeycomb filters of Example 1 had a diameter of the end face of 132 mm and a length in the extending direction of the cells of 110 μmm. The thickness of the partition wall was 215.9 μm and a cell density was 46 cells/cm$^2$. The thickness of the partition wall is shown in Tables 1.

For the honeycomb filter of Example 1, the "porosity (%)" and the "average pore diameter D (μm)" of the partition wall were measured by the following method. Further, the "ratio (%) of total opening area of pores with equivalent circle diameter exceeding 3 μm", the "average equivalent circle opening diameter R (μm) of pores on partition wall surface", the "ratio (R/D) of average equivalent circle opening diameter R (μm) with respect to average pore diameter D (μm)", and the "ratio (%) of total opening area of pores with equivalent circle diameter of 40 μm or more" were determined by the above-described method. In addition, the "pore The honeycomb filter of Example 1 was evaluated for filtration efficiency and pressure loss by the following method. In the respective evaluations of filtration efficiency and pressure loss, the platinum group element-containing catalyst was loaded on each honeycomb filter to be evaluated by the following method, and measurements were performed on each honeycomb filter after loading the catalyst. The results are shown in Table 2.

(Catalyst Loading Method)

First, a catalyst slurry containing aluminum oxide having an average particle diameter of 30 μm was prepared. The catalyst was then loaded on the honeycomb filter using the prepared catalyst slurry. Specifically, loading of the catalyst was performed by dipping the honeycomb filter, and then blowing off the excess catalyst slurry by air to load a predetermined amount of the catalyst on the partition wall of the honeycomb filter. Thereafter, the honeycomb filter loaded with the catalyst was dried at 100° C., and further heat-treated at 500° C. for 2 hours, to obtain a honeycomb filter with a catalyst. The loaded amount of the catalyst loaded on the honeycomb filter of Example 1 was 75 g/L.

(Filtration Efficiency)

First, an exhaust gas purification device was manufactured in which the honeycomb filter with a catalyst of each example and comparative example was used as a filter for purifying exhaust gas. Next, the exhaust gas purification device thus manufactured was connected to an outlet side of the engine exhaust manifold of a 1.2 L direct injection type gasoline engine vehicle, and the number of soot particles contained in the gas emitted from the outlet port of the exhaust gas purification device was measured by a PN measurement method. Regarding the running mode, a running mode (RTS95) simulating the worst of RDE running was carried out. The cumulative number of soot particles emitted after mode-running was defined as the number of soot particles in the exhaust gas purification device to be judged, and filtration efficiency (%) was calculated from the number of soot particles. Then, when the value of filtration efficiency of the exhaust gas purification device using the honeycomb filter with a catalyst of Comparative Example 1 was set to 100%, the value (%) of filtration efficiency of the exhaust gas purification device using the honeycomb filter with a catalyst of each example and comparative example was determined. In the filtration efficiency evaluation, the honeycomb filter of each example and comparative example was evaluated based on the following evaluation criteria.

Evaluation "Excellent": When the value of filtration efficiency ratio (%) exceeds 120%, the evaluation is regarded as "Excellent".

Evaluation "Good": When the value of filtration efficiency ratio (%) exceeds 110% and is 120% or less, the evaluation is regarded as "Good".

Evaluation "Acceptable": When the value of filtration efficiency ratio (%) exceeds 100% and is 110% or less, the evaluation is regarded as "Acceptable".

Evaluation "Fail": When the value of filtration efficiency ratio (%) is 100% or less, the evaluation is regarded as "Fail".

(Pressure Loss)

Exhaust gas emitted from a 1.2 L direct injection type gasoline engine was flowed in at a flow rate of 600 $m^3/h$ at 700° C. to measure the pressure between the inflow end face side and the outflow end face side of the honeycomb filter with a catalyst. Then, pressure loss (kPa) of the honeycomb filter was determined by calculating the pressure difference between the inflow end face side and the outflow end face side. Then, when the value of pressure loss of the honeycomb filter with a catalyst of Comparative Example 1 was set to 100%, the value (%) of pressure loss of the honeycomb filter with a catalyst of each example and comparative example was determined. In the pressure loss evaluation, the honeycomb filter of each example was evaluated based on the following evaluation criteria.

Evaluation "Excellent": When the value of pressure loss ratio (%) is 90% or less, the evaluation is regarded as "Excellent".

Evaluation "Good": When the value of pressure loss ratio (%) exceeds 90% and is 95% or less, the evaluation is regarded as "Good".

Evaluation "Acceptable": When the value of pressure loss ratio (%) exceeds 95% and is 100% or less, the evaluation is regarded as "Acceptable".

Evaluation "Fail": When the value of pressure loss ratio (%) exceeds 100%, the evaluation is regarded as "Fail".

Examples 2 to 7

In Examples 2 to 7, the configuration of the honeycomb structure was changed as shown in Table 1. In Examples 2 to 7, the honeycomb structure was prepared by adjusting the average particle size of pore former and the average particle diameter of kaolin, alumina, and aluminium hydroxide so as to have the characteristics of Examples 2 to 7.

Comparative Examples 1 to 6

In Comparative Examples 1 to 6, the configuration of the honeycomb structure was changed as shown in Table 1. In Comparative Examples 1 to 6, crushed pore former, and kaolin, alumina, and aluminium hydroxide having an average particle size exceeding 7 μm were used.

The honeycomb filters of Examples 2 to 7 and Comparative Examples 1 to 6 were also evaluated for filtration efficiency and pressure loss in the same manner as in Example 1. Table 2 shows the results. The honeycomb filter of Comparative Example 1 serves as an evaluation criterion in each evaluation.

TABLE 2

| | Filtration efficiency Evaluation Judgment | Pressure loss Evaluation Judgment |
|---|---|---|
| Comparative Example 1 | — | — |
| Comparative Example 2 | Fail | Excellent |
| Comparative Example 3 | Acceptable | Fail |
| Comparative Example 4 | Fail | Excellent |
| Comparative Example 5 | Acceptable | Fail |
| Comparative Example 6 | Acceptable | Fail |
| Example 1 | Acceptable | Good |
| Example 2 | Good | Excellent |
| Example 3 | Excellent | Good |
| Example 4 | Good | Good |
| Example 5 | Acceptable | Good |
| Example 6 | Acceptable | Excellent |
| Example 7 | Excellent | Acceptable |

(Results)

The honeycomb filters of Examples 1 to 7 were superior to the honeycomb filter of Comparative Example 1 as an evaluation criterion in evaluating filtration efficiency and pressure loss. In particular, the honeycomb filter of Example 2 had a porosity (%) of the partition wall of 69% and a pore depth of pore of 3 μm, and the evaluation result of pressure loss was particularly excellent. The honeycomb filter of Example 3 had an average equivalent circle opening diameter of 5 μm and a ratio of pores with an equivalent circle diameter of 40 μm or more of 5%, and the evaluation result of filtration efficiency was particularly excellent.

On the other hand, the honeycomb filter of Comparative Example 2 has a ratio (%) of the total opening area of pores with an equivalent circle diameter exceeding 3 μm of 71%, and a ratio (RID) of the average equivalent circle opening diameter R (μm) with respect to the average pore diameter D (μm) of 0.9, and the evaluation result (judgement) of filtration efficiency was failed.

The honeycomb filter of Comparative Example 3 has a ratio (%) of the total opening area of pores with an equivalent circle diameter exceeding 3 μm of 57%, and the evaluation result (judgement) of pressure loss was failed.

The honeycomb filter of Comparative Example 4 has a porosity (%) of the partition wall of 71% and a ratio (R/D) of the average equivalent circle opening diameter R (μm) with respect to the average pore diameter D (μm) of 0.9, and the evaluation result (judgement) of pressure loss was failed.

The honeycomb filter of Comparative Example 5 has a porosity (%) of the partition wall of 59%, and the evaluation result (judgement) of pressure loss was failed.

The honeycomb filter of Comparative Example 6 has a ratio (R/D) of the average equivalent circle opening diameter R (μm) with respect to the average pore diameter D (μm) of 1.9, and the evaluation result (judgement) of pressure loss was failed.

INDUSTRIAL APPLICABILITY

The honeycomb filter of the present invention can be used as a filter for trapping particulate matter in exhaust gas.

DESCRIPTION OF REFERENCE NUMERALS

1: partition wall, 2: cell, **2*a*: inflow cell, 2*b*: outflow cell, 3: circumferential wall, 4: honeycomb structure, 5: plugging portion, 11: inflow end face, 12: outflow end face, and 100**: honeycomb filter.

What is claimed is:

1. A honeycomb filter comprising: a pillar-shaped honeycomb structure having a porous partition wall disposed to surround a plurality of cells which serve as a fluid through channel extending from an inflow end face to an outflow end face; and a porous plugging portion provided at either an end on the inflow end face side or an end on the outflow end face side of the cell; wherein the partition wall is composed of a material containing cordierite as a main component, a porosity of the partition wall is 60 to 70%, a ratio (S2/S1×100%) of a total S2 of an opening area of pores which exist within a unit surface area S1 and which have an equivalent circle diameter exceeding 3 μm with respect to the unit surface area S1 of the partition wall is 58 to 70%, and a ratio (R/D) of an average equivalent circle opening diameter R (μm) of pores which exist at a surface of the partition wall and which have an equivalent circle diameter exceeding 3 μm with respect to an average pore diameter D (μm) of the partition wall measured by a mercury press-in method is 0.3 to 0.8.

2. The honeycomb filter according to claim 1, wherein a ratio (S3/S2×100%) of a total S3 of an opening area of pores which exist within the unit surface area S1 and which have an equivalent circle diameter of 40 μm or more with respect to the total S2 of an opening area of pores which exist within a unit surface area S1 and which have an equivalent circle diameter exceeding 3 μm is 3 to 5%.

3. The honeycomb filter according to claim 1, wherein a pore depth of pores on the surface of the partition wall is 1.0 to 3.0 μm as determined by a laser microscope.

4. The honeycomb filter according to claim 1, wherein a thickness of the partition wall is 190.5 to 254 μm.

* * * * *